Jan. 22, 1952  L. PENTEL  2,583,156
SUPPORT FOR ARTIFICIAL TEETH
Original Filed June 2, 1948

INVENTOR
Leon Pentel
BY
Alfred E Page
ATTORNEY

Patented Jan. 22, 1952

2,583,156

UNITED STATES PATENT OFFICE 2,583,156

SUPPORT FOR ARTIFICIAL TEETH

Leon Pentel, Forest Hills, N. Y.

Original application June 2, 1948, Serial No. 30,680. Divided and this application May 11, 1951, Serial No. 225,859

6 Claims. (Cl. 32—9)

This invention relates to artificial teeth, and more particularly to new and useful improvements for their attachment to interchangeable backings through the use of back plates. This application is a division of my copending application Serial No. 30,680, filed June 2, 1948 for "Support of Artificial Teeth," now Patent 2,563,416.

Heretofore, certain interchangeable artificial teeth facings have been provided with slots which receive dowels attached to backings, which in turn are attached to the dental prosthesis. These teeth were made of porcelain, since it was impractical to utilize any other material. However, should the dowel be shorter than required or the porcelain facing ground too thin, a fracture or lack of retention of the facing inwardly resulted. Attempts to use plastic resins in a similar manner were likewise ineffectual, since efforts to attach the facing to the backing by means of the usual cementing medium resulted in a fracture. The resinous plastics, by virtue of their ability to deform and to absorb stress will break away from any cementing bond or agent. The only successful attempts to secure artificial teeth of plastic resinous material to dental prosthesis was accomplished by processing the resin directly onto an irregularly faced backing. In the event of fracture or damage, however, particularly in the case of a fixed bridge prosthesis, it was necessary to forcefully remove the prosthesis appliance —a hazardous procedure which often results in irreparable damage to the prosthesis and at times to the teeth to which the appliance was attached.

The present invention provides that a back plate with retention means, such as loops or headed legs, be precision fitted to the interchangeable backings upon which the plastic artificial tooth facing can be processed. With such a construction the cementing agent will bond a metal surface against a metal surface practically eliminating loss of retention of the facing.

The use of resinous plastics for artificial tooth facings will be possible in more cases which are not suited for the use of porcelain (i. e. short bite cases where long facings are required). Finally, where such emergencies as replacement of the facing or fracture of the facing arise, replacement of the artificial tooth facing will be possible without removing the prosthesis from the mouth, as the back plates will be completely adaptable to any of the interchangeable backing designs. Deformation of the plastic during masticatory function will now be a nominal factor since it is attached to a back plate which in turn is cemented. The retention loops or headed legs will adequately deter actual fracture or loss of retention of the plastic from the backing plate. Since no stresses will be transferred to the cementing agent less frequent failure of the cement to retain the facing in place results.

More specifically, this invention relates particularly to the backing plate and its retention loops or headed legs, to which the plastic may be processed. The backing plate with the attached artificial tooth of resinous plastic material is designed to be attached by the usual cementing agent to the usual interchangeable backing support.

The present invention proposes providing the back face of a metal plate for an artificial tooth of resinous plastic material with a novel means for securely attaching the plate to the tooth and to the dowel of the facing so that the connections will be able to withstand normal chewing pressures and so overcome the objections to the prior art constructions.

Still further, the present invention proposes providing the front or anterior face of the backing plate with one or more U-shaped retention loops and/or headed legs arranged in a manner to be molded into the material of the artificial tooth of resinous plastic material to securely attach the backing plate to the tooth.

Another object of the invention proposes attaching the U-shaped retention loops to the backing plate with its intermediate arm bridging the back face of the socket and with its side arms directed toward and secured to the backing plate on opposite sides of the socket in a manner so that the material of the artificial tooth may be completely molded around the U-shaped retention loops.

Still another object of the present invention proposes the provision of a means for securely attaching backing plates to artificial teeth which can be used in connection with the projecting dowels of the dental bridge or other support regardless of whether the dowels are vertically or horizontally arranged.

It is a further object of this invention to construct a backing plate for an artificial tooth of resinous plastic material which is simple and durable and which may be manufactured and sold at a reasonable cost.

For further comprehension of the invention, and of the objects and advantages thereof, reference will be had to the following description and accompanying drawings, and to the appended 2,583,156

3 claims in which the various novel features of the invention are more particularly set forth.

In the accompanying drawings forming a material part of this disclosure:

Figure 1:
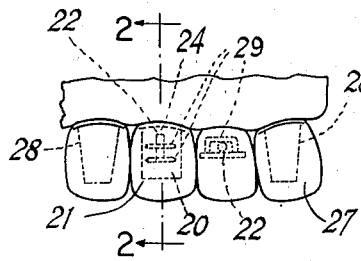
Fig. 1 is a front elevational view of a portion of a person's gum provided with a fixed dental bridge having artificial teeth secured thereto by means of metal backing plates and attached dowels constructed in accordance with the present invention.
Figure 2:
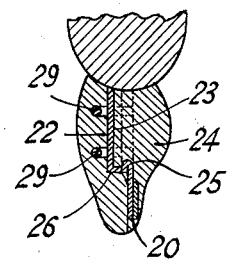
Fig. 2 is an enlarged vertical sectional view taken on the line 2—2 of Fig. 1.
Figure 3:
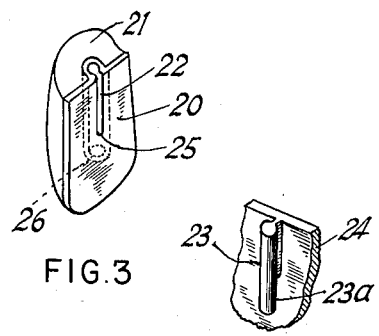
Fig. 3 is a rear perspective view of one of the artificial teeth provided with a metal backing plate in accordance with the present invention.
Figure 4:
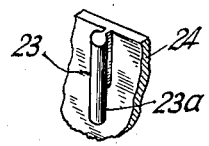
Fig. 4 is a partial perspective view of a portion of the dental bridge showing the projecting dowel which is normally received in the socket of the metal backing plate.
Figure 5:
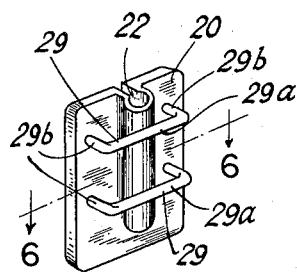
Fig. 5 is a front perspective view of the metal backing plate per se.
Figure 6:
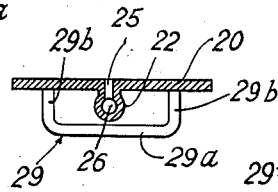
Fig. 6 is an enlarged horizontal sectional view taken on the line 6—6 of Fig. 5.

The metal backing plate of the present invention and in accordance with the first form of the invention shown in Figs. 1 to 6, includes a flat metal plate 20 which is to be molded into the back face of an artificial tooth 21, see Fig. 3. The artificial tooth is formed of a resinous plastic material. The metal plate 20 is formed with a vertically arranged socket 22 of key shaped cross section. As shown in Figs. 2 and 3, the socket 22 is adapted to be molded into the material of the artificial tooth 21 and has its top end open to receive the projecting dowel 23 of a dental bridge or similar support 24. As is customary in the field, a cement is to be used for securing together the adjacent faces of the socket 22 and the projecting dowel 23; however, the manner of securing together those parts forms no part of this invention and further details will not be given in this specification.

From Fig. 2 it will be noted that the socket 22 of the metal backing plate 20 is open along the back face of the socket and formed with an upwardly extending lip 25 forming a receiving opening 26 in the bottom portion of the socket 22. The projecting dowel 23 of the dental bridge or similar support 24 is formed with a downwardly projecting portion 23ª, see Fig. 4, which is adapted to be received in the opening 26 when the backing plate 20 is in position on the dental bridge or similar support 24, as shown in Fig. 2. This interengagement of the projecting portion 23ª with the receiving opening 26 of the socket 22 makes the connection of the backing plate 20 with the bridge or similar support 24 more rigid.

From Fig. 1 it will be noted that the ends of

4 the dental bridge 24 are provided with the usual abutments, crowns or inlays 27 which are to be cemented in position upon the prepared natural teeth 28 of the mouth. Again, the method of mounting the dental bridge 24 in position in the mouth forms no part of this invention, and further details will not be included in this specification, as such details are generally known to those skilled in the art.

The front face of the metal backing plate 20 is provided with means for securely attaching the metal backing plate to the artificial tooth of resinous plastic material and to prevent the tooth from breaking loose from the metal backing plate under normal chewing pressures after the artificial tooth has been mounted in the mouth.

The novel securing means of the present invention comprises a pair of vertically spaced horizontally arranged U-shaped retention loops 29. These U-shaped retention loops 29 are formed of short lengths of wire bent into the desired U-shaped formation. The intermediate arms 29ª of the U-shaped retention loops 29 bridge the socket 22 which projects from the front face of the metal backing plate 20 and the free ends of the side arms 29ᵇ of the U-shaped retention loops are directed toward and secured to the back face of the metal backing plate 20 on opposite sides of the socket 22. The arrangement of the U-shaped retention loops 29 is clearly shown in Figs. 5 and 6.

Fig. 2 of the drawing clearly illustrates the manner in which the U-shaped retention loops 29 are embedded into the material of the artificial tooth 21 after the artificial tooth has been molded in position upon the metal backing plate 20. It is apparent that the U-shaped retention loops 29 serve to securely anchor the artificial tooth 21 to the metal backing plate 20 and make it impossible for the artificial tooth 21 to break loose from the metal backing plate 20 under normal chewing pressures when mounted in the mouth.

It is preferred that the free ends of the side arms 29ᵇ of the U-shaped retention loops 29 be soldered to the adjacent face of the metal backing plate 20; however, the free ends of the side arms 29ᵇ may be secured to the metal plate in any other desired manner.

Figure 7:
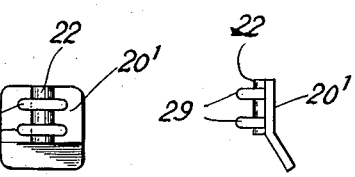
Fig. 7 is a front elevational view of a backing plate constructed in accordance with the present invention for use in connection with a back tooth.
Figure 8:
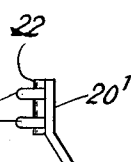
Fig. 8 is a side elevational view of Fig. 7.

In Figs. 7 and 8 of the drawing, there is illustrated a metal backing plate 20' constructed in accordance with a modification of the invention. The metal backing plate 20' of this modification is similar to that previously described except that it is provided with a slight bend between its top and bottom edges, which adapts this backing plate for use on an artificial tooth of resinous plastic material which is to replace one of the back teeth of the human mouth.

Figure 9:
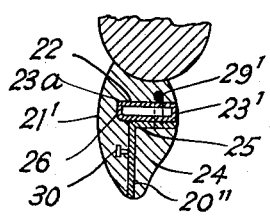
Fig. 9 is a further vertical sectional view taken on the line 9—9 of Fig. 1 showing a tooth arranged to be mounted on a horizontally disposed dowel of a dental bridge and provided with a metal backing plate in accordance with the present invention.
Figure 10:
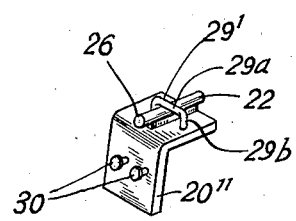
Fig. 10 is a front perspective view of the metal backing plate designed for use with the tooth shown in Fig. 9.

In Figs. 9 and 10 the present invention is shown applied to a metal plate 20" attached to an artificial tooth 21' for mounting the tooth 21' upon the projecting dowel 23' which is horizontally disposed upon a top portion of the dental bridge 24'.

Also, the front face of the backing plate 20" of this modification instead of being supplied with two spaced U-shaped retention loops is formed with only one U-shaped retention loop 29', which bridges the socket 22 on the top portion of the backing plate 20", see Fig. 10. The depending portion of the backing plate 20" is formed with a pair of spaced headed legs 30 which are adapted to be molded into the face of the artificial tooth 21'.

In other respects this form of the invention is similar to those previously described and like reference numerals identify like parts in each of the several views.

Figure 11:
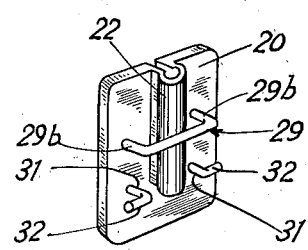
Fig. 11 is a view similar to Fig. 5, but illustrating the metal pivot constructed in accordance with a further modification of the invention.

In the modification of the invention disclosed in Fig. 11 of the drawing, the front face of the metal backing plate 20 is provided with a single U-shaped retention loop 29.

Below the single retention loop 29, the metal backing plate 20 is formed with spaced legs 31 which have their outer ends 32 bent at right angles thereto to be molded into the material of the artificial tooth to assist the single retention loop 29 in securely attaching the metal backing plate 20 to the back face of the artificial tooth.

In other respects this form of the pivot is similar to that shown in Figs. 2 to 6 and like reference numerals identify like parts in each of the several views.

While I have illustrated and described the preferred embodiments of my invention, it is to be understood that I do not limit myself to the precise constructions herein disclosed and the right is reserved to all changes and modifications coming within the scope of the invention as defined in the appended claims.

What is claimed is:

1. A backing plate for an artificial tooth for attachment to a dental bridge or similar support, said backing plate comprising a flat portion having a hollow, key-shaped elongated rib on its front face and forming a socket to telescopically receive a conformingly shaped projection on the bridge or support; said rib being adapted to be molded into the material of the artificial tooth engaging the front face of such portion; and a loop member extending along such front face across said rib; said loop member being adapted to be molded into the tooth material for additional interlocking of the plate and tooth.

2. A backing plate for an artificial tooth for attachment to a dental bridge or similar support, said backing plate comprising a flat portion having a hollow, key-shaped elongated rib on its front face and forming a socket to telescopically receive a conformingly shaped projection on the bridge or support; said rib being adapted to be molded into the material of the artificial tooth engaging the front face of such portion; such opening extending only part of the length of the rib; and a loop member extending along such front face across said rib; said loop member being adapted to be molded into the tooth material for additional interlocking of the plate and tooth.

3. A backing plate for an artificial tooth for attachment to a dental bridge or similar support, said backing plate comprising a flat portion having a hollow, key-shaped elongated rib on its front face and forming a socket to telescopically receive a conformingly shaped projection on the bridge or support; said rib being adapted to be molded into the material of the artificial tooth engaging the front face of such portion; such opening extending only part of the way from one end of the rib to the other; and a loop member extending along such front face across said rib; said loop member being adapted to be molded into the tooth material for additional interlocking of the plate and tooth.

4. A backing plate as claimed in claim 1 including a second flat portion extending at an angle to said first mentioned flat portion.

5. A backing plate as claimed in claim 1 including a pair of loop members arranged in spaced relation to each other.

6. A backing plate as claimed in claim 1 including a second flat portion extending at an angle to said first mentioned flat portion, said second flat portion having laterally extended elements on its front face adapted for molding into the tooth material.

LEON PENTEL.

REFERENCES CITED

The following references are of record in the file of this patent:

UNITED STATES PATENTS

| Number | Name | Date |
|---|---|---|
| 1,112,252 | Bienvenu | Sept. 29, 1914 |
| 1,498,869 | Cross | June 24, 1924 |